United States Patent [19]

Gaugas

[11] Patent Number: 5,563,116
[45] Date of Patent: Oct. 8, 1996

[54] METHOD AND COMPOSITION FOR SUPPLYING SULPHUR TO A PLANT

[76] Inventor: Joseph M. Gaugas, 34 Clarence Avenue, Cliftonville, Margate, Kent, CT9 3DR, United Kingdom

[21] Appl. No.: 443,622

[22] Filed: May 18, 1995

[51] Int. Cl.⁶ ..................................................... A01N 41/02
[52] U.S. Cl. ............................................. 504/350; 504/123
[58] Field of Search ...................................... 504/350, 123

[56] References Cited

U.S. PATENT DOCUMENTS 4,694,073  9/1987  Bentle et al. ............................. 530/399
5,139,791  8/1992  Nakajima et al. ........................... 426/2

FOREIGN PATENT DOCUMENTS

0279619A2  8/1988  European Pat. Off. .......... C07K 3/08
2281558    3/1995  United Kingdom ............ C05F 11/00

*Primary Examiner*—Allen J. Robinson
*Assistant Examiner*—Brian G. Bembenick
*Attorney, Agent, or Firm*—Charles D. Gunter, Jr.

[57] ABSTRACT

A method of supplying sulphur to a plant growing in a plant growth medium, or to a plant growth medium in which a plant is to be grown, comprises applying to the plant or to the plant growth medium a composition which includes a plant physiologically acceptable amount of dimethylsulphone.

14 Claims, No Drawings

METHOD AND COMPOSITION FOR SUPPLYING SULPHUR TO A PLANT

This invention relates to a method of supplying sulphur to a plant and to plant nutrient compositions for use in that method. The invention also provides a plant which has been treated by the method.

BACKGROUND TO THE INVENTION

Sulphur is an essential element in the growth and health of most plants. It is known to treat plants suffering from sulphur deficiency with ionic sulphates, for example magnesium, potassium, or ammonium sulphate. A relatively large weight of ionic sulphate, however, needs to be fed to a plant to provide sufficient sulphur for good health in a form in which the plant can use it.

The term "plant" is used herein to denote any plant, whether for food, ornamental, or other purposes. The term includes seeds, seedlings, and the like.

I have now found a new method of treating a plant to providing sulphur to the plant in a physiologically acceptable form.

SUMMARY OF THE INVENTION

I have found that by treating the plant with dimethyl sulphone (hereinafter referred to as DMS; also known as methylsulphonylmethane) in plant physiologically acceptable amounts it is possible to promote healthy plant growth in a plant suffering from sulphur deficiency. This is a surprising result because homologues of DMS, for example ethylsulphonylmethane, are phytotoxic. The weight of DMS required to correct the sulphur deficiency is less than the weight of magnesium sulphate required to produce a similar result.

In addition to the correction of sulphur deficiency, I have also surprisingly found that the supply of DMS to certain plant species may also promote further growth in already healthy plants. The mechanism for this enhancement of growth is not yet known; it may be due to sulphur donation or it may, for example, be related to an increased permeability of plant cell membranes to nutrient ions induced by the DMS.

Accordingly, the present invention provides a method of supplying sulphur to a plant, which method comprises applying a composition which includes a plant physiologically acceptable amount of DMS to a plant growing in a plant growth medium, or to a plant growth medium in which a plant is to be grown The plant growth medium may be any suitable substrate, for example soil, peat, or other organic medium, or a hydroponic solution.

The invention is suitable for use in conventional agriculture, for example the feeding of farm crops, but it is also particularly suitable for horticulture, and the feeding of plants growing in glass houses, particularly in hydroponic media.

The DMS may be applied as a solution in a solvent, for example water, to the leaves of the plant, or to the soil or other medium in which the plant is growing. Alternatively the DMS may be added to a conventional fertiliser mixture, either as a solid or in liquid form, for administration to the plant.

The invention also provides a plant nutrient composition comprising a plant physiologically acceptable amount of DMS in admixture with at least one plant nutrient selected from the group comprising nitrogen, phosphorus, and potassium.

The composition may be added to the plant growth medium as granules, pellets, or a powder. DMS is readily commercially available in solid form, and it is suitable for use in its commercially available form. When the DMS is used in solid form it may optionally be formulated in a sustained release form; for example the solid DMS may be coated with a wax, resin, or with elemental sulphur which causes the DMS, after coming into contact with moisture, to dissolve in that moisture over a period of days or weeks.

In a preferred embodiment, the composition includes further includes a carrier medium. The carrier medium may be a solid or semi-solid, for example soil, peat, or a fertiliser mixture. The DMS is preferably formulated in the solid or semi-solid mixture at a concentration of 0.01% to 10% by weight, and it is particularly preferred to be in the range 0.5% to 5% by weight. The solid or semi-solid mixture may be dissolved in water prior to its application to a plant or a plant growth medium, or it may be added directly to the plant growth medium.

Alternatively the carrier medium may be a liquid; the liquid may be any diluent carrier that does not adversely affect the health of the plant; preferably the liquid is water. The DMS preferably is present in a concentration of 0.01 to 1.0 gl$^{-1}$ (grams per liter), and it is particularly preferred to be in a concentration of 0.05 to 0.50 gl$^{-1}$. Other nutrients, growth modifiers, or pesticides may also optionally be added to the carrier medium, for example sulphates, phosphates, or nitrates.

The DMS may be incorporated into conventional fertilisers or plant feed additives by admixture as a granular solid, or by dissolving the DMS to form a solution which dries out during granule formation of, for example, a fertiliser base.

According to a further aspect of the invention there is provided the use of DMS for supplying sulphur to a plant growing in a plant growth medium.

Many varieties or families of plant may be treated with DMS as described above, to give an enhancement to growth or to provide a nutritionally beneficial sulphur supplement; these include Brassica, for example cabbage or broccoli, cereals, for example wheat or barley, and root vegetables, for example sugar beet.

The invention also provides a plant which has been treated with a composition including DMS.

DESCRIPTION OF THE PREFERRED EMBODIMENT

To illustrate the invention by way of example, the following experiments were carried out on cabbage seedlings.

EXPERIMENT 1

The seedlings were all prepared by germinating cabbage seeds for a week. The seedlings were then supported by pieces of card so that their roots were in a hydroponic solution and the shoots were in air.

Three basic stock hydroponic solutions were used, and these were composed as follows:

| Component | Concentration/gl$^{-1}$ |
| --- | --- |
| Ca(NO$_3$)$_2$.4H$_2$O | 1.333 |
| MgSO$_4$.7H$_2$O | 0.167 |
| KH$_2$PO$_4$ | 0.333 |
| Ferric EDTA | 0.025 |

Plus Boron, Zinc, Manganese & Molybdenum in trace (sub-micromolar) amounts.

SOLUTION 2

As for Solution 1, but replacing 50% of the magnesium sulphate by a molar equivalent amount of magnesium chloride.

SOLUTION 3

As for solution 1, but replacing all of the magnesium sulphate by a molar equivalent amount of magnesium chloride.

The stock solutions all contain the same concentrations of chemical species, except for a varying ratio of sulphate to chloride ions. Solution 1 provides sufficient sulphate for normal cabbage growth.

DMS was added in varying proportions to each of the stock solutions. For each stock solution, four concentrations of DMS were prepared, at concentrations of 0.00, 0.05, 0.10, and 0.50 gl$^{-1}$.

Each of the 12 combinations of stock solution and DMS was put in a jar, and a seedling was supported in each jar by means of a piece of card with a hole in it so that the roots of the seedlings were immersed in the solution, and the shoots were in the air above the hardboard.

The seedlings were then allowed to grow for six weeks in a glass house during early summer. The heights of the plants were measured, and an assessment was made of their health by visual observation of the leaves. Results are given in Table 1 for the approximate height of the plants, in mm, for each of the 12 hydroponic solutions.

TABLE 1

| Solution | DMS Concentration/gl$^{-1}$ | | | |
| --- | --- | --- | --- | --- |
|  | 0.00 | 0.05 | 0.10 | 0.50 |
| 1 | 115 | 160 | 128 | 115 |
| 2 | 112 | 132 | 147 | 125 |
| 3 | 61 | 108 | 125 | 86 |

Table 1 shows that plants fed on a nutrient solution containing DMS grew taller than those fed on a nutrient solution without DMS. The leaves were also bigger for plants fed on DMS, although this effect was not quantified. A concentration of 0.05 to 0.10 gl$^{-1}$ of DMS produced healthy plants. At 0.50 gl$^{-1}$ there was less growth improvement than for the lower concentrations, indicating that 0.50 gl$^{-1}$ is close to the upper limit for physiological acceptability in cabbages.

Doubling the level of sulphate, without DMS, did not significantly affect the growth of the plants. When DMS was added to the nutrient solutions in any of the experimental concentrations it produced bigger plants. This indicates that DMS can not only provide a physiologically acceptable source of sulphur for plants, but it may also enhance plant growth.

EXPERIMENT 2

Ten spring cabbage seeds were germinated to produce large seedlings, and then transplanted into commercial compost in a pot. The plants were divided into a test group of five plants and a control group of five plants, and were watered twice weekly. The plants in the test group were treated with DMS at a concentration of 0.1 gl$^{-1}$, in the water, and the plants in the control group were not treated with DMS.

Miracle-Gro all-purpose water soluble plant food was fed equally to both test groups. Miracle-Gro is a registered trade mark. The plant food comprises nitrogen, phosphorus, and potassium (NPK), in an approximate ratio of 1:2:1. It has trace quantities of iron, copper, zinc, manganese, boron, and molybdenum. Solutions of the plant food were prepared according to the manufacturer's instructions, using 18 ml of plant food per 4.5 liters of water. Each plant was fed with an equal quantity of the solution of plant food every 10 days, as indicated by soil dryness.

The plants were kept outdoors and protected from above against rain. After eight weeks of treatment the plants were each removed from the compost by cutting through the stem of the plant at a point level with the surface of the surrounding compost, and then weighed. Results for the test group and the control group are given in Table 2 below. The numbers are the weight in grams of each plant.

TABLE 2

| TEST GROUP | CONTROL GROUP |
| --- | --- |
| 830 | 590 |
| 752 | 680 |
| 726 | 628 |
| 682 | 632 |
| 746 | 628 |
| MEAN 747 | 632 |

The test group treated with DMS averaged a little over 18% greater weight than the control group. The spring cabbages in the test group were noticeably larger than those in the control group, and had larger fronds.

Furthermore, the internodes of the plants treated with DMS were noticeably shorter, and the stems were noticeably thicker, than those of the plants in the control group. This makes the cabbages in the control group less prone to wind damage, as well as looking aesthetically more pleasing.

Thus DMS may be used to aid plant growth in compost as well as hydroponic plant growth media.

While preferred embodiments of the invention have been shown, it should be apparent to those skilled in the art that what have been described are considered to be preferred embodiments of the method of providing sulphur to a plant of this invention. In accordance with patent statute, changes may be made in the invention without actually departing from the true spirit and scope of this invention. The following claims are intended to cover all such changes and modifications which fall in the true spirit and scope of the invention.

What I claim is:

1. A method of supplying sulphur to a plant, which method comprises applying a composition which includes a plant physiologically acceptable amount of DMS to at least one member of a group selected from a plant growing in a plant growth medium, and a plant growth medium in which a plant is to be grown.

2. A method as claimed in claim 1, wherein the composition comprises DMS in a carrier medium.

3. A method as claimed in claim 2, wherein the carrier medium is a fertiliser mixture.

4. A method as claimed in claim 2, wherein the carrier medium is water.

5. A plant nutrient composition comprising a plant physiologically acceptable amount of DMS in admixture with at least one plant nutrient selected from the group comprising nitrogen, phosphorus, and potassium.

6. A plant nutrient composition as claimed in claim 5, which composition further includes a carrier medium.

7. A plant nutrient composition as claimed in claim 6, wherein the carrier medium is a solid or semi-solid.

8. A plant nutrient composition as claimed in claim 5, wherein the DMS is present in a concentration in the range 0.01 to 10% by weight.

9. A plant nutrient composition as claimed in claim 5, wherein the DMS is present in a concentration in the range 0.5 to 5% by weight.

10. A plant nutrient composition as claimed in claim 6, wherein the carrier medium is a liquid.

11. A plant nutrient composition as claimed in claim 10, wherein the liquid is water.

12. A plant nutrient composition as claimed in claim 10, wherein the DMS is present in a concentration in the range 0.01 to 1.0 $gl^{-1}$.

13. A plant nutrient composition as claimed in claim 10, wherein the DMS is present in a concentration in the range 0.05 to 0.5 $gl^{-1}$.

14. A plant nutrient composition as claimed in claim 7, wherein the DMS is formulated in a sustained release form.

\* \* \* \* \*